(12) United States Patent
Ma

(10) Patent No.: US 8,850,921 B2
(45) Date of Patent: Oct. 7, 2014

(54) CABLE-LENGTH-ADJUSTMENT DEVICE

(75) Inventor: Yutang Ma, Shanghai (CN)

(73) Assignee: Chrysler Group LLC, Auburn Hills, MI (US)

( * ) Notice: Subject to any disclaimer, the term of this patent is extended or adjusted under 35 U.S.C. 154(b) by 422 days.

(21) Appl. No.: 13/323,228

(22) Filed: Dec. 12, 2011

(65) Prior Publication Data

US 2013/0146401 A1 Jun. 13, 2013

(51) Int. Cl.
*F16C 1/22* (2006.01)
(52) U.S. Cl.
USPC .................................. 74/502.6; 74/501.5 R
(58) Field of Classification Search
CPC ......... F16D 55/226; F16D 65/18; F16D 1/10; F16D 1/22
USPC ........... 74/89.23, 500.5, 501.5 R, 502, 502.4, 74/502.5, 502.6, 503; 188/2 D, 196 V, 202
See application file for complete search history.

(56) References Cited

U.S. PATENT DOCUMENTS

| | | | |
|---|---|---|---|
| 4,669,330 A | 6/1987 | Stocker | |
| 4,694,706 A | 9/1987 | Lichtenberg et al. | |
| 4,716,781 A | 1/1988 | Dussault | |
| 4,936,161 A | 6/1990 | Polando | |
| 5,039,138 A * | 8/1991 | Dickirson | 285/314 |
| 5,156,064 A | 10/1992 | Truman | |
| 5,207,116 A | 5/1993 | Sultze | |
| 5,259,265 A | 11/1993 | Gabas et al. | |
| 5,588,333 A | 12/1996 | Kitamura | |
| 5,653,148 A * | 8/1997 | Reasoner | 74/502.4 |
| 5,664,461 A | 9/1997 | Kitamura | |
| 5,706,706 A | 1/1998 | Kitamura | |
| 5,709,132 A | 1/1998 | Irish et al. | |
| 5,850,763 A | 12/1998 | Kitamura | |
| 6,003,403 A | 12/1999 | Klippert et al. | |
| 6,247,380 B1 * | 6/2001 | Cebollero | 74/502.6 |
| 6,378,922 B1 | 4/2002 | Troudt | |
| 7,469,617 B2 * | 12/2008 | Basile et al. | 74/501.5 R |
| 7,609,924 B2 * | 10/2009 | Anderson et al. | 385/100 |

FOREIGN PATENT DOCUMENTS

JP 06115424 A * 4/1994

OTHER PUBLICATIONS

Machine translation of JP 06115424 A obtained on Mar. 18, 2014.*

* cited by examiner

*Primary Examiner* — Thomas R Hannon
*Assistant Examiner* — Adam D Rogers
(74) *Attorney, Agent, or Firm* — Ralph E Smith

(57) ABSTRACT

An adjustment device may include a conduit-adjustment mechanism and a cable-adjustment mechanism. The conduit-adjustment mechanism may be connected to first and second conduit segments and may be movable to adjust a position of one of the first and second conduit segments relative to the other of the first and second conduit segments. The cable-adjustment mechanism may be connected to first and second cable segments at least partially received within the first and second conduit segments, respectively. The cable-adjustment mechanism may be configured to transmit motion between the first and second cable segments. The cable-adjustment mechanism may be movable independently of the conduit-adjustment mechanism to adjust a position of one of the first and second cable segments relative to the other of the first and second cable segments.

14 Claims, 5 Drawing Sheets

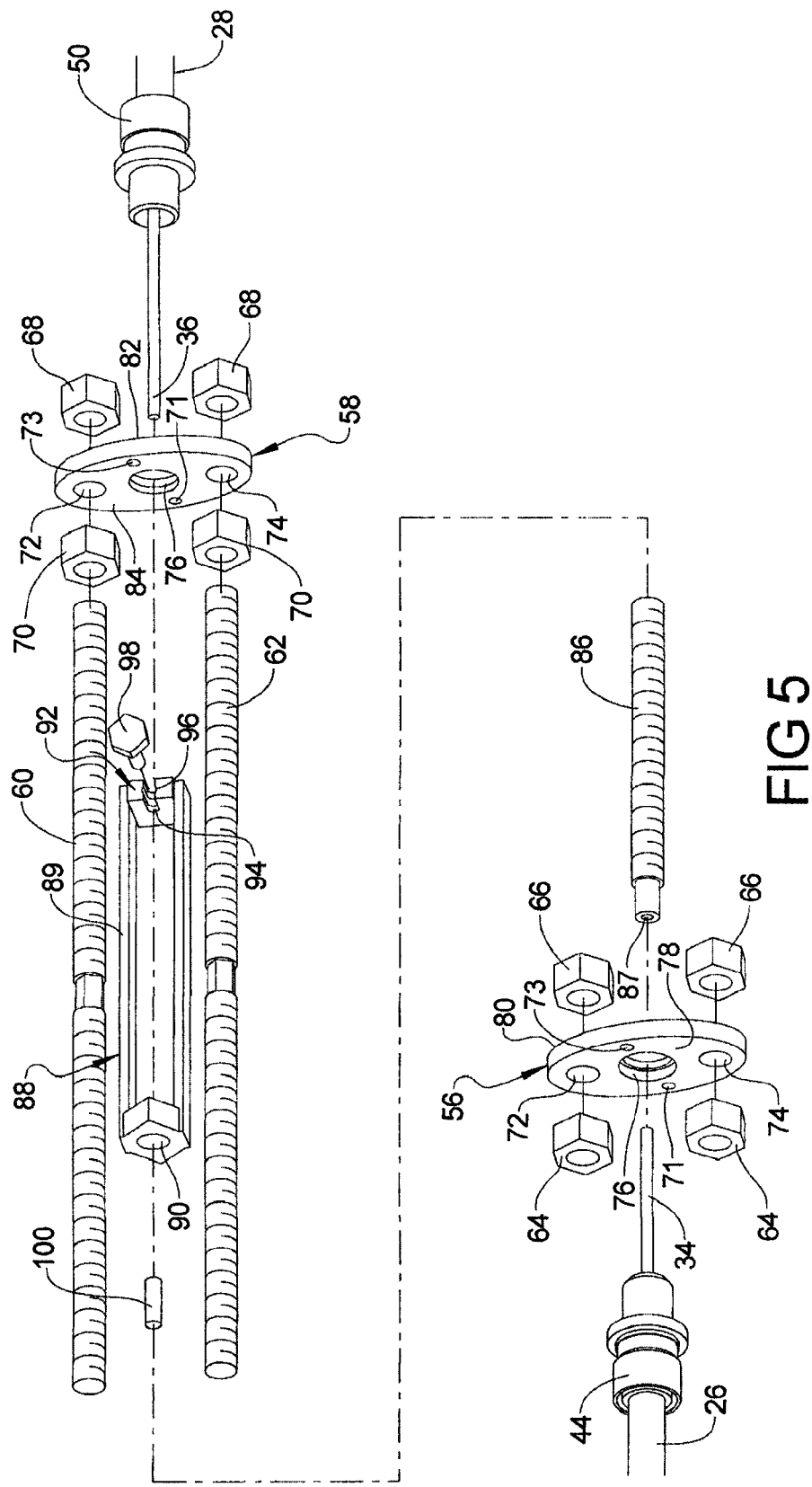

ental mechanism. The brake assembly may be configured to apply a frictional force to a wheel of the vehicle. The cable may operatively interconnect the brake actuator and the brake assembly. The cable may include a first cable segment connected to the brake actuator and a second cable segment connected to the brake assembly. The cable conduit may include first and second conduit segments. The first conduit segment may receive the first cable segment for relative movement therebetween. The second conduit segment may receive the second cable segment for relative movement therebetween. The conduit-adjustment mechanism may be connected to the first and second conduit segments and may be movable to adjust a position of one of the first and second conduit segments relative to the other of the first and second conduit segments. The cable-adjustment mechanism may be connected to the first and second cable segments and may be configured to transmit motion between the first and second cable segments. The cable-adjustment mechanism may be movable independently of the conduit-adjustment mechanism to adjust a position of one of the first and second cable segments relative to the other of the first and second cable segments.

CABLE-LENGTH-ADJUSTMENT DEVICE

FIELD

The present disclosure relates to a device for adjusting a length of a cable.

BACKGROUND

A vehicle may include one or more cables that transmit a force from one component of the vehicle to another. For example, a brake system may include a cable that connects a brake pedal or lever to a brake mechanism at or near a wheel of the vehicle. During development of a vehicle, positioning of the brake pedal and/or the brake mechanism may change such that a distance therebetween is changed and/or a routing path of the cable through the vehicle is changed. In conventional vehicles, the cable must be replaced to accommodate such changes.

SUMMARY

In one form, the present disclosure provides an adjustment device that may include a conduit-adjustment mechanism and a cable-adjustment mechanism. The conduit-adjustment mechanism may be connected to first and second conduit segments and may be movable to adjust a position of one of the first and second conduit segments relative to the other of the first and second conduit segments. The cable-adjustment mechanism may be connected to first and second cable segments at least partially received within the first and second conduit segments, respectively. The cable-adjustment mechanism may be configured to transmit motion between the first and second cable segments. The cable-adjustment mechanism may be movable independently of the conduit-adjustment mechanism to adjust a position of one of the first and second cable segments relative to the other of the first and second cable segments.

In some embodiments, the cable-adjustment mechanism may include a first threaded member threadably engaging a second threaded member. The first threaded member may be fixed to the first cable segment. In some embodiments, the cable-adjustment mechanism may include a threaded fastener securing one of the first and second threaded members relative to the corresponding one of the first and second cable segments.

In some embodiments, the conduit-adjustment mechanism may include a first member attached to the first conduit segment and a second member attached to the second conduit segment. The first member may be threadably adjustable relative to the second member.

In some embodiments, the conduit-adjustment mechanism may include a pair of elongated members and a first bracket member. The first bracket member may be fixed to one of the first and second conduit segments. The elongated members may be slidable relative to the first bracket member.

In some embodiments, the conduit-adjustment mechanism may include threaded members threadably engaging the elongated members and movable relative thereto to adjust a position of the elongated members relative to the first bracket member.

In some embodiments, the elongated members may be slidable relative to a second bracket member that is fixed relative to the second conduit segment.

In another form, the present disclosure provides a vehicle that may include a brake actuator, a brake assembly, a cable, a cable conduit, a conduit-adjustment mechanism, and a cable-adjustment mechanism. The brake assembly may be configured to apply a frictional force to a wheel of the vehicle. The cable may operatively interconnect the brake actuator and the brake assembly. The cable may include a first cable segment connected to the brake actuator and a second cable segment connected to the brake assembly. The cable conduit may include first and second conduit segments. The first conduit segment may receive the first cable segment for relative movement therebetween. The second conduit segment may receive the second cable segment for relative movement therebetween. The conduit-adjustment mechanism may be connected to the first and second conduit segments and may be movable to adjust a position of one of the first and second conduit segments relative to the other of the first and second conduit segments. The cable-adjustment mechanism may be connected to the first and second cable segments and may be configured to transmit motion between the first and second cable segments. The cable-adjustment mechanism may be movable independently of the conduit-adjustment mechanism to adjust a position of one of the first and second cable segments relative to the other of the first and second cable segments.

In some embodiments, the brake assembly may be a parking brake assembly, for example.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

When an element or component is referred to as being "on," "engaged to," "connected to," or "coupled to" another element or component, it may be directly on, engaged, connected or coupled to the other element or component, or intervening elements or components may be present. In contrast, when an element or component is referred to as being "directly on," "directly engaged to," "directly connected to," or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

BRIEF DESCRIPTION OF THE DRAWINGS

FIG. 5 is an exploded perspective view of the adjustment mechanism according to the principles of the present disclosure.

DETAILED DESCRIPTION

Figure 1:
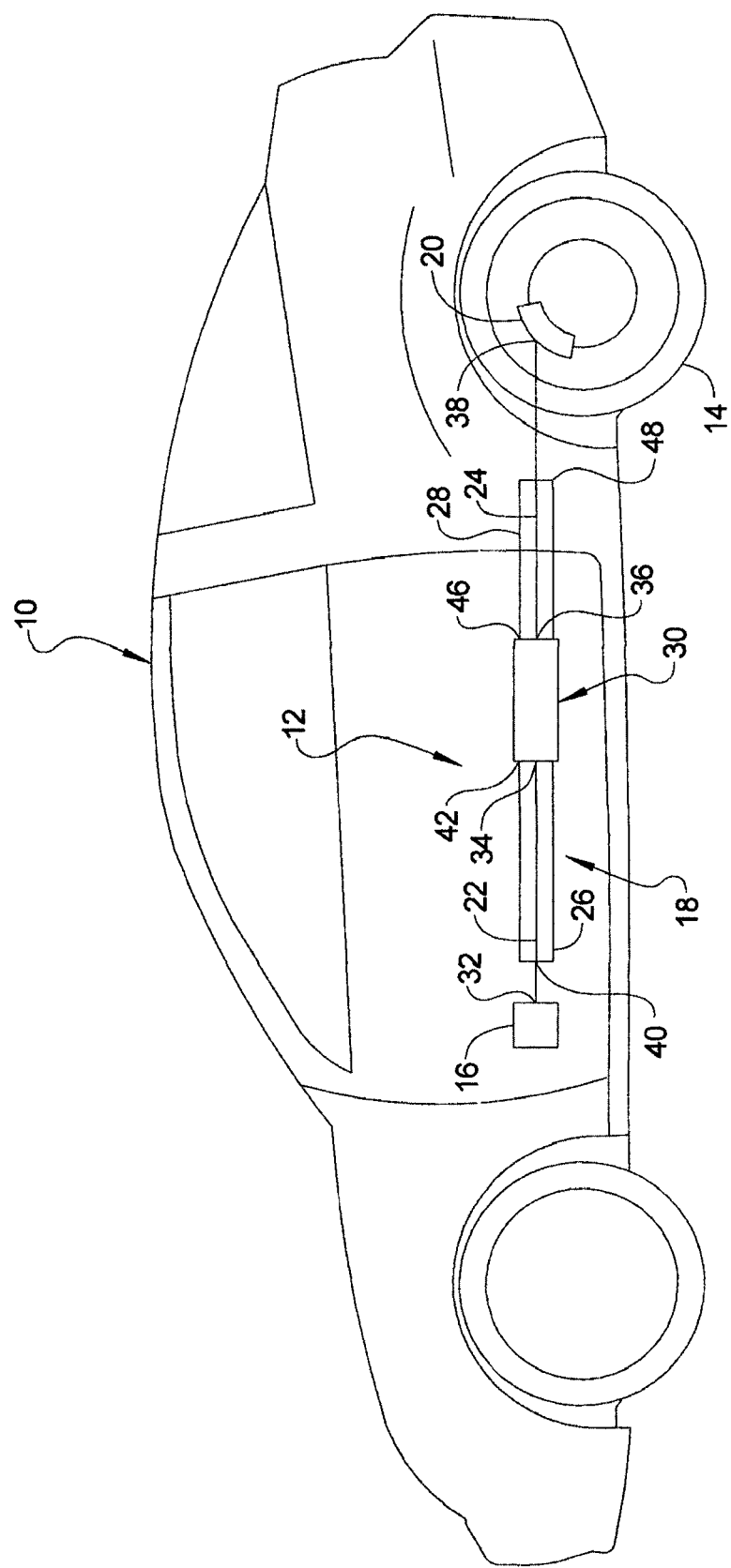
FIG. 1 is a schematic representation of a vehicle including a cable assembly having an adjustment mechanism according to the principles of the present disclosure.
Figure 2:
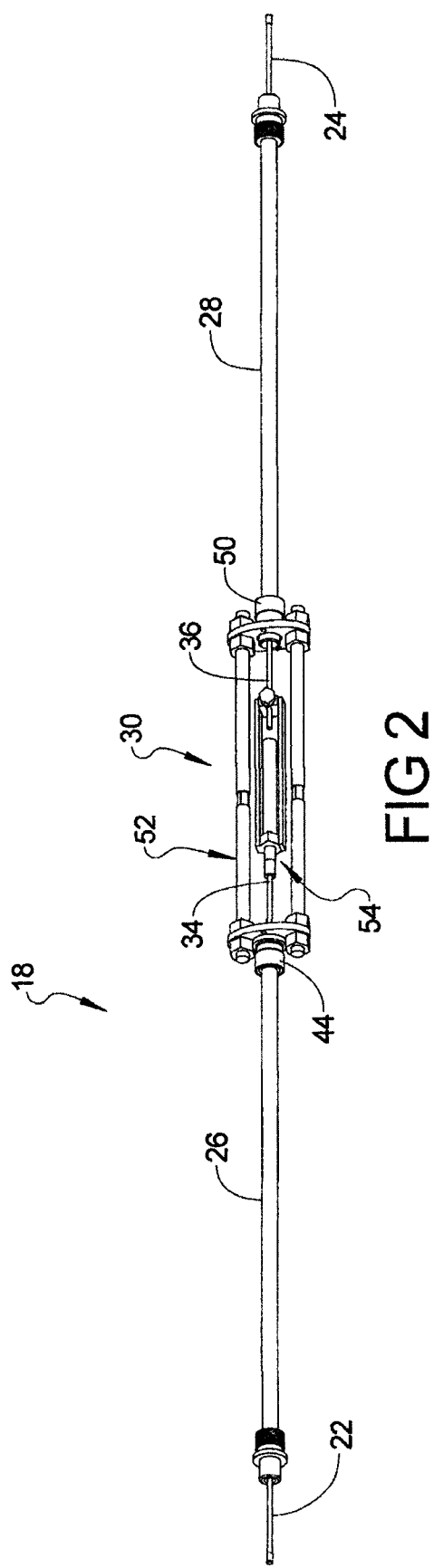
FIG. 2 is a partial perspective view of the cable assembly of FIG. 1.

In an exemplary embodiment and with reference to FIGS. 1-5, a vehicle 10 is provided that may include a brake system 12 and a plurality of wheels 14. The brake system 12 may be operable to apply a frictional force to one or more of the plurality of wheels 14. The brake system 12 may include a brake pedal or hand lever 16, a cable assembly 18, and a brake mechanism 20. A driver of the vehicle 10 may actuate the brake mechanism 20 by applying a force to the brake lever 16. This force is transmitted from the brake lever 16 through the cable assembly 18 to the brake mechanism 20. The brake mechanism 20 may include a disc or drum member (not shown), for example, that applies a frictional force to one or more of the plurality of wheels 14. The brake system 12 could be a parking brake system, for example, or any other type of brake system. As will be subsequently described, a length of the cable assembly 18 may be adjustable to accommodate various distances between the brake lever 16 and the brake mechanism 20.

The cable assembly 18 may include a first cable segment 22, a second cable segment 24, a first conduit segment 26, a second conduit segment 28, and an adjustment device 30. The first cable segment 22 may extend between the brake lever 16 and the adjustment device 30 and may include a first end 32 and a second end 34. The first end 32 may be connected to the brake lever 16. The second end 34 may be connected to the adjustment device 30. The second cable segment 24 may extend between the adjustment device 30 and the brake mechanism 20 and may include a first end 36 and a second end 38. The first end 36 may be connected to the adjustment device 30. The second end 38 may be connected to the brake mechanism 20.

The first and second cable segments 22, 24 may be at least partially received in the first and second conduit segments 26, 28, respectively, and may be moveable relative thereto. The first conduit segment 26 may include a first end 40 and a second end 42. The second end 42 may include a fitting 44 attached to the adjustment device 30. The second conduit segment 28 may include a first end 46 and a second end 48. The second end 48 may include a fitting 50 attached to the adjustment device 30.

The adjustment device 30 may be operable to adjust an overall length of a cable assembly 18 to accommodate various distances between the brake lever 16 and the brake mechanism 20. The adjustment device 30 may include a conduit-adjustment mechanism 52 and a cable-adjustment mechanism 54. The conduit-adjustment mechanism 52 may be operable to adjust a distance between the second end 42 of the first conduit segment 26 and the first end 46 of the second conduit segment 28. The cable-adjustment mechanism 54 may be operable to adjust a distance between the second end 34 of the first cable segment 22 and the first end 36 of the second cable segment 24. The conduit-adjustment mechanism 52 and the cable-adjustment mechanism 54 may be operable independently of each other.

The conduit-adjustment mechanism 52 may include a first bracket 56, a second bracket 58, a first elongated member 60, a second elongated member 62, pairs of first and second adjustment members 64, 66, and pairs of third and fourth adjustment members 68, 70. As shown in FIG. 5, the first and second brackets 56, 58 may be disc-shaped plates and may each include first and second mounting apertures 71, 73, first and second guide apertures 72, 74, and a counterbored central aperture 76 disposed between the first and second mounting apertures 71, 73 and between the first and second guide apertures 72, 74. The first elongated member 60 may slidably engage the first guide apertures 72 of the first and second brackets 56, 58. The second elongated member 62 may slidably engage the second guide apertures 74 of the first and second brackets 56, 58. The fittings 44, 50 of the first and second conduit segments 26, 28 may engage the central apertures 76 of the first and second brackets 56, 58, respectively. Fasteners (not shown) may engage the first and second mounting apertures 71, 73 to selectively secure the brackets 56, 58 to structures (not shown) of the vehicle 10 after the conduit-adjustment mechanism 52 is adjusted to a desired position.

The first and second adjustment members 64, 66 may threadably engage the first and second elongated members 60, 62. The first adjustment members 64 may abut the first side 78 of the first bracket 56. The second adjustment members 66 may abut a second side 80 of the first bracket 56. The third adjustment members 68 may abut a first side 82 of the second bracket 58. The fourth adjustment members 70 may abut a second side 84 of the second bracket 58.

The cable-adjustment mechanism 54 may include a first member 86 and a second member 88. The first member 86 may include a cable-receiving aperture 87 that receives the second end 34 of the first cable segment 22. The first member 86 may be crimped onto the second end 34 such that the first member 86 is fixed relative to the first cable segment 22.

The second member 88 may include a body portion 89 having a first threaded aperture 90 and a base 92. The first threaded aperture 90 may threadably engage the first member 86. The base 92 may include a slot 94 having a threaded portion 96 (FIG. 5). The slot 94 may receive the first end 36 of the second cable segment 24 such that the second member 88 may be rotatable relative to the second cable segment 24. A fastener 98 may engage the threaded portion 96. An end fitting 100 may be crimped onto the first end 36 of the second cable segment 24. The end fitting 100 may have a diameter that is larger than the width of the slot 94. In this manner, the fastener 98 and the end fitting 100 may cooperate to prevent the second cable segment 24 from disengaging the slot 94.

With continued reference to FIGS. 1-5, operation of the adjustment device 30 will be described in detail. As described above, the conduit-adjustment mechanism 52 and the cable-adjustment mechanism 54 may be operable to independently adjust a distance between the first and second conduit segments 26, 28 and a distance between the first and second cable segments 22, 24. In this manner, the cable assembly 18 may be incorporated into various vehicles having various distances between the brake lever 16 and the brake mechanism 20. Additionally or alternatively, the conduit-adjustment mechanism 52 and the cable-adjustment mechanism 54 may be adjustable to accommodate changes in the distance between the brake lever 16 and the brake mechanism 20 of the vehicle 10. Such changes in the distance between the brake lever 16 and the brake mechanism 20 may be made as a result of a modification to the brake system 12 or during development of the brake system 12 and/or other components of the vehicle 10, for example.

Figure 3:
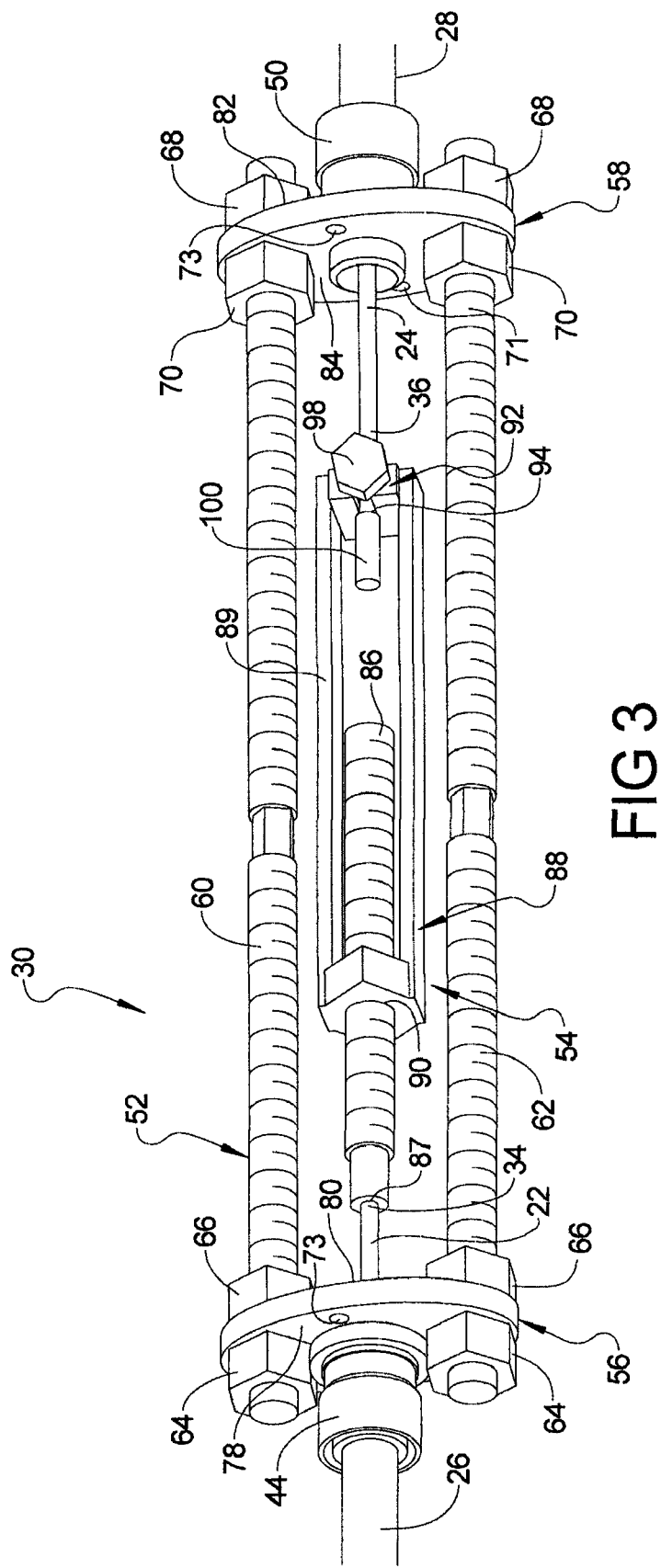
FIG. 3 is a perspective view of the adjustment mechanism in a first position according to the principles of the present disclosure.
Figure 4:
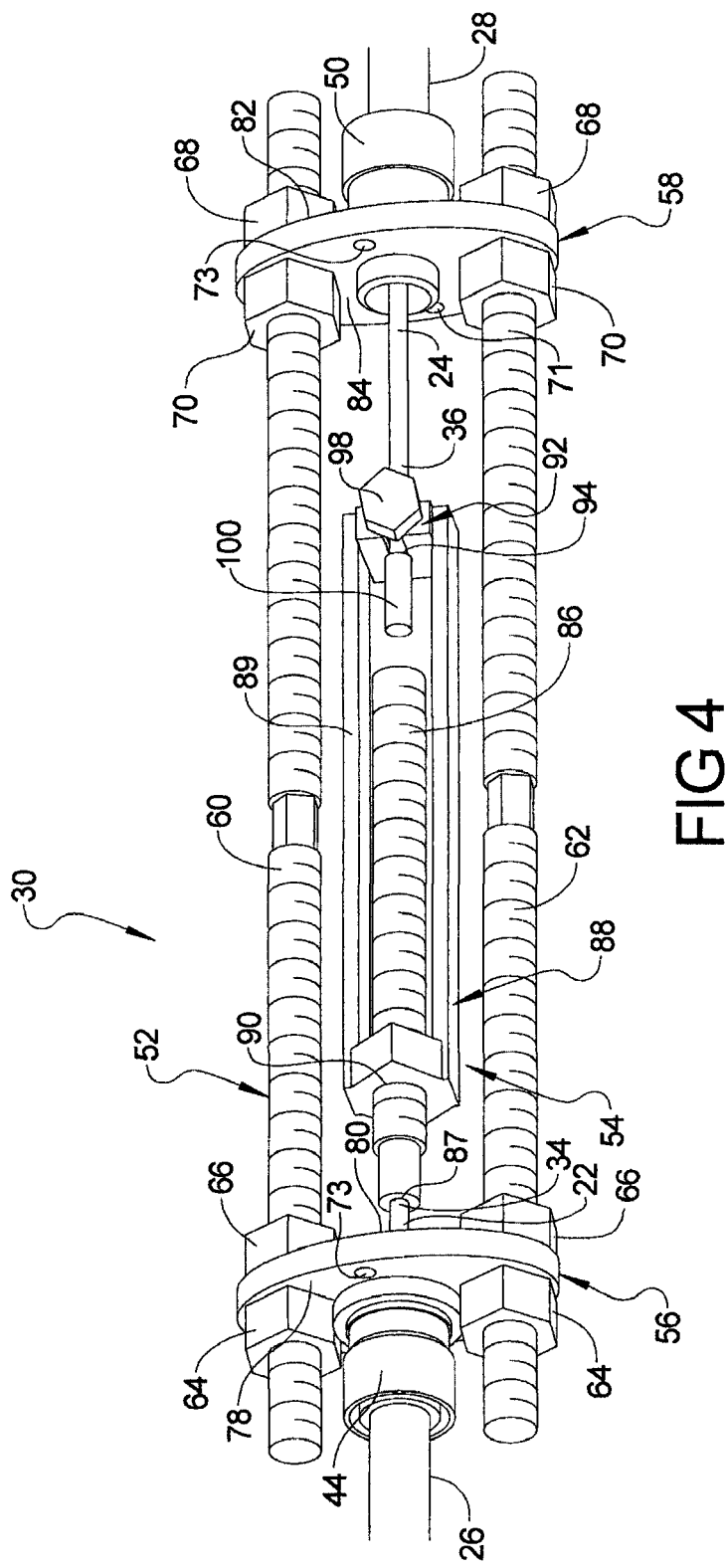
FIG. 4 is a perspective view of the adjustment mechanism in a second position according to the principles of the present disclosure.

To accommodate a given distance between the brake lever 16 and the brake mechanism 20 of a particular vehicle, a manufacturer of the vehicle or of the brake system 12 may operate the cable-adjustment mechanism 54 to adjust an overall length of the cable assembly 18 by adjusting a distance between the second end 34 of the first cable segment 22 and the first end 36 of the second cable segment 24 (compare FIGS. 3 and 4). This can be done by rotating the second member 88 relative to the first member 86 and the first and second cable segments 22, 24. Relative rotation between the first and second members 86, 88 adjusts the depth of the first member 86 within the first aperture 90. Accordingly, rotation of the second member 88 relative to the first member 86 in a first direction increases the distance between the first and second cable segments 22, 24, and rotation of the second member 88 relative to the first member 86 in a second direction decreases the distance between the first and second cable segments 22, 24.

Additionally or alternatively, the manufacturer of the vehicle or brake system 12 may operate the conduit-adjustment mechanism 52 to adjust a distance between the first and second conduit segments 26, 28 (compare FIGS. 3 and 4). This can be done by adjusting positions of one or both of the first and second brackets 56, 58 along the lengths of the first and second elongated members 60, 62. In order to slidably adjust the first bracket 56 relative to the first and second elongated members 60, 62, the first and/or second adjustment members 64, 66 may be threadably moved along the first and second elongated members 60, 62 away from the first bracket 56. The first bracket 56 may then be slidably moved along the first and second elongated members 60, 62 to a desired position. To fix the first bracket 56 in a selected position along the first and second elongated members 60, 62, the first and second adjustment members 64, 66 may be threadably tightened against the first bracket 56.

Similarly, to adjust a position of the second bracket 58 along the first and second elongated members 60, 62, the third and fourth adjustment members 68, 70 may be threadably moved away from the second bracket 58. The second bracket 58 may then be slidably moved along the first and second elongated members 60, 62 to a desired position. To fix the second bracket 58 in a selected position along the first and second elongated members 60, 62, the third and fourth adjustment members 68, 70 may be threadably tightened against the second bracket 58.

While the cable assembly 18 is described above as being incorporated into a brake system 12 of the vehicle 10, it will be appreciated that cable assembly 18 could be incorporated into any other system or device.

What is claimed is:

1. An adjustment device comprising:
    a conduit-adjustment mechanism connected to a first conduit segment and a second conduit segment and movable to adjust a position of one of the first and second conduit segments relative to the other of the first and second conduit segments; and
    a cable-adjustment mechanism connected to a first cable segment and a second cable segment at least partially received within the first and second conduit segments, respectively, the cable-adjustment mechanism being configured to transmit motion between the first and second cable segments and movable independently of the conduit-adjustment mechanism to adjust a position of one of the first and second cable segments relative to the other of the first and second cable segments,
    wherein the conduit-adjustment mechanism includes a pair of elongated members and a first bracket member, the first bracket member being fixed to one of the first and second conduit segments, the elongated members being slidable relative to the first bracket member,
    wherein the conduit-adjustment mechanism includes threaded members threadably engaging the elongated members and movable relative thereto to adjust a position of the elongated members relative to the first bracket member.

2. The adjustment device of claim 1, wherein the cable-adjustment mechanism includes a first threaded member threadably engaging a second threaded member.

3. The adjustment device of claim 2, wherein the first threaded member is fixed to the first cable segment.

4. The adjustment device of claim 2, wherein the cable-adjustment mechanism includes a threaded fastener securing one of the first and second threaded members relative to the corresponding one of the first and second cable segments.

5. The adjustment device of claim 1, wherein the elongated members are slidable relative to a second bracket member that is fixed relative to the second conduit segment.

6. The adjustment device of claim 5, wherein the cable-adjustment mechanism includes first and second threaded members fixed to the first and second cable segments, respectively, the first threaded member threadably engaging the second threaded member.

7. The adjustment device of claim 1, wherein the cable-adjustment mechanism and the conduit-adjustment mechanism are incorporated into a brake system of a vehicle.

8. A vehicle comprising:
    a brake actuator;
    a brake assembly configured to apply a frictional force to a wheel of the vehicle;
    a cable operatively interconnecting the brake actuator and the brake assembly, the cable including a first cable segment connected to the brake actuator and a second cable segment connected to the brake assembly;
    a cable conduit including a first conduit segment and a second conduit segment, the first conduit segment receiving the first cable segment for relative movement therebetween, the second conduit segment receiving the second cable segment for relative movement therebetween;
    a conduit-adjustment mechanism connected to the first and second conduit segments and movable to adjust a position of one of the first and second conduit segments relative to the other of the first and second conduit segments; and
    a cable-adjustment mechanism connected to the first and second cable segments and configured to transmit motion between the first and second cable segments, the cable-adjustment mechanism being movable independently of the conduit-adjustment mechanism to adjust a position of one of the first and second cable segments relative to the other of the first and second cable segments,
    wherein the conduit-adjustment mechanism includes a pair of elongated members and a first bracket member, the first bracket member being fixed to one of the first and second conduit segments, the elongated members being slidable relative to the first bracket member,
    wherein the conduit-adjustment mechanism includes threaded members threadably engaging the elongated members and movable relative thereto to adjust a position of the elongated members relative to the first bracket member.

9. The vehicle of claim 8, wherein the cable-adjustment mechanism includes a first threaded member threadably engaging a second threaded member.

10. The vehicle of claim 9, wherein the first threaded member is fixed to the first cable segment.

11. The vehicle of claim 10, wherein the cable-adjustment mechanism includes a threaded fastener securing one of the first and second threaded members relative to the corresponding one of the first and second cable segments.

12. The vehicle of claim 8, wherein the elongated members are slidable relative to a second bracket member that is fixed relative to the second conduit segment.

13. The vehicle of claim 12, wherein the cable-adjustment mechanism includes first and second threaded members fixed to the first and second cable segments, respectively, the first threaded member threadably engaging the second threaded member.

14. The vehicle of claim 13, wherein the brake assembly is a parking brake assembly.

\* \* \* \* \*